United States Patent [19]
Ryoke et al.

[11] Patent Number: 6,012,969
[45] Date of Patent: Jan. 11, 2000

[54] ABRASIVE MEMBER FOR VERY HIGH RETURN LOSS OPTICAL CONNECTOR FERRULES

[75] Inventors: Katsumi Ryoke; Masaaki Fujiyama; Tadashi Ishiguro, all of Kanagawa-ken, Japan

[73] Assignee: Fuji Photo Film Co., Ltd., Kanagawa-ken, Japan

[21] Appl. No.: 08/744,321

[22] Filed: Nov. 7, 1996

[30] Foreign Application Priority Data

Nov. 21, 1995 [JP] Japan ................................. 7-302676

[51] Int. Cl.[7] ........................................................ B24B 1/00
[52] U.S. Cl. .................................. 451/41; 451/42; 451/28
[58] Field of Search ............................ 451/539, 526, 451/41, 36, 28, 37, 42; 51/295, 297; 360/128

[56] References Cited

U.S. PATENT DOCUMENTS 5,611,826  3/1997  Ryoke et al. ............................ 451/539
5,633,068  5/1997  Ryoke et al. ............................ 451/539

FOREIGN PATENT DOCUMENTS 3-81708  4/1991  Japan ................................. G02B 6/32

*Primary Examiner*—David A. Scherbel
*Assistant Examiner*—Derris Holt Banks
*Attorney, Agent, or Firm*—Sughrue, Mion, Zinn, Macpeak & Seas, PLLC

[57] ABSTRACT

An abrasive member for a very high return loss optical connector ferrule is used in abrading an end of an optical connector ferrule having a ferrule hole, in which an optical fiber has been inserted and secured, into a convex spherical surface. The abrasive member comprises a flexible substrate and an abrasive layer, which is formed on the surface of the flexible substrate and comprises a binder and abrasive grains. The surface roughness Ra, expressed in terms of arithmetic mean deviation, of the abrasive layer falls within the range of 0.01 $\mu$m to 0.05 $\mu$m. The abrasive member carries out polishing such that the surface smoothness of the ferrule surface and the optical fiber surface may be kept high, such that a difference in level between the ferrule surface and the optical fiber surface may not occur, and such that the very high return loss characteristics may thereby be obtained.

4 Claims, No Drawings

ABRASIVE MEMBER FOR VERY HIGH RETURN LOSS OPTICAL CONNECTOR FERRULES

BACKGROUND OF THE INVENTION

1. Field of the Invention

This invention relates to an abrasive member, such as an abrasive sheet or an abrasive disk, for use in finish polishing for abrading an end of an optical connector ferrule having a ferrule hole, in which an optical fiber has been inserted and secured, into a convex spherical surface having very high return loss characteristics.

2. Description of the Prior Art

As techniques for abrading an end of an optical connector ferrule having a ferrule hole, in which an optical fiber has been inserted and secured, into a convex spherical surface, various polishing methods utilizing abrasive sheets or free abrasive grain retaining films have heretofore been proposed.

One example of the polishing methods is proposed in Japanese Unexamined Patent Publication No. 3(1991)-81708. With the proposed polishing method, a predetermined level of tension is imparted to a cellulose type of resin film, and an end of an optical connector ferrule is pushed against the surface of the resin film and slid on the surface of the resin film. During the sliding movement of the end of the optical connector ferrule, a coolant liquid containing silica type of abrasive grains is supplied to the position, at which the end of the optical connector ferrule comes into contact with the surface of the resin film.

However, with the aforesaid polishing of the optical connector ferrule, it is not always possible to carry out the polishing such that the surface smoothness of the ferrule surface and the optical fiber surface may be kept high, such that a difference in level between the ferrule surface and the optical fiber surface may not occur, and such that the very high return loss characteristics may thereby be obtained.

In particular, there is a difference in abrasion characteristics between the ferrule, which is constituted of a ceramic material, and the optical fiber, which is constituted of a glass material, due to the difference in material. Also, the polishing is carried out while the abrasive member is being kept in the elastic state such that the end of the ferrule may be abraded into a convex spherical surface. For such reasons, it is difficult to abrade the end of the ferrule into a desired shape, and considerable time and labor are required to control the conditions for the polishing.

SUMMARY OF THE INVENTION

The primary object of the present invention is to provide an abrasive member, which is suitable for abrading an end of an optical connector ferrule.

The present invention provides an abrasive member for a very high return loss optical connector ferrule, the abrasive member being used in abrading an end of an optical connector ferrule having a ferrule hole, in which an optical fiber has been inserted and secured, into a convex spherical surface, the abrasive member comprising a flexible substrate and an abrasive layer, which is formed on the surface of the flexible substrate and comprises a binder and abrasive grains, wherein the surface roughness Ra, expressed in terms of arithmetic mean deviation (according to JIS-B-R0601-1982), of the abrasive layer falls within the range of 0.01 $\mu$m to 0.05 $\mu$m (and should preferably be at most 0.025 $\mu$m).

If the surface roughness Ra, expressed in terms of arithmetic mean deviation, of the abrasive layer is lower than 0.01 $\mu$m and the surface of the abrasive member is thus very smooth, the abrasive power of the abrasive member will become low, and the time required for the polishing cannot be kept short. If the surface roughness Ra, expressed in terms of arithmetic mean deviation, of the abrasive layer is higher than 0.05 $\mu$m and the surface of the abrasive member is thus very coarse, the smoothness of the abraded surface of the optical connector ferrule will become low, and the light amount transmission characteristics cannot be kept good. Also, a large difference in level will occur between the optical fiber surface and the ferrule surface, and therefore the desired super-low reflection characteristics cannot be obtained.

In the abrasive member in accordance with the present invention, the thickness of the flexible substrate should preferably fall within the range of 25 $\mu$m to 125 $\mu$m. Also, the abrasive grains contained in the abrasive layer should preferably be constituted of chromium oxide grains having a mean grain diameter falling within the range of 0.1 $\mu$m to 1 $\mu$m.

In the abrasive member in accordance with the present invention, the surface roughness Ra, expressed in terms of arithmetic mean deviation, of the surface of the abrasive layer falls within the range of 0.01 $\mu$m to 0.05 $\mu$m. Thus the abrasive member in accordance with the present invention has the very smooth surface. In order for the surface roughness Ra falling within the aforesaid range to be obtained, after the abrasive layer has been overlaid upon the flexible substrate, the surface of the abrasive layer is smoothed with a calendering process. Alternatively, the time required to carry out the dispersing process of the coating composition for forming the abrasive layer is set to be 2–10 times longer than the ordinary dispersing time, and the smooth surface of the abrasive layer is thereby obtained. In the aforesaid calendering process, by way of example, the abrasive member is passed between an elastic roll and a heated metal roll, and the surface of the abrasive member is thereby smoothed under heat and pressure.

When the end of the optical connector ferrule is to be abraded by using the abrasive member in accordance with the present invention, the abrasive member (which may take on the form of an abrasive sheet, or the like) is secured to a rotatable table constituted of an elastic material, such as rubber, and the end of the optical connector ferrule is brought into contact with and pushed against the abrasive member. The rotatable table is rotated, and the optical connector ferrule is caused to undergo a planetary movement. The end of the optical connector ferrule is thereby abraded.

The polishing may be of the dry type. The polishing should preferably be of the wet type. During the wet type of polishing, an aqueous coolant solution should preferably be supplied to the position, at which the end of the optical connector ferrule comes into contact with the surface of the abrasive member. The coolant solution may contain fine abrasive grains (silica, alumina, or the like). As silica, colloidal silica should preferably be employed. The grain diameter of colloidal silica should preferably fall within the range of approximately 0.005 $\mu$m to approximately 0.05 $\mu$m. The abrasion time should preferably fall within the range of 5 to 200 seconds, and the load should preferably fall within the range of 1 g to 1,000 g.

With the abrasive member in accordance with the present invention, wherein the surface roughness Ra, expressed in terms of arithmetic mean deviation, of the abrasive layer formed on the flexible substrate is set to fall within the range of 0.01 μm to 0.05 μm, the end of the optical connector ferrule can be abraded into a desired convex spherical surface, such that the smoothness of the ferrule surface and the optical fiber surface may be kept good, and such that a difference in level between the ferrule surface and the optical fiber surface may not occur. Therefore, the super-low reflection characteristics required for the optical connector can be obtained, and the transmission efficiency can be kept high. Also, the polishing can be carried out easily.

DETAILED DESCRIPTION OF THE INVENTION

The present invention will hereinbelow be described in further detail.

In an embodiment of the abrasive member for a super-low reflection optical connector ferrule in accordance with the present invention, the abrasive member (which may take on the form of an abrasive sheet) comprises a flexible substrate, which has a thickness falling within the range of 25 μm to 125 μm, and an abrasive layer, which is formed on one surface of the flexible substrate and comprises a binder abrasive grains, and the like. The surface roughness Ra, expressed in terms of arithmetic mean deviation, of the abrasive layer falls within the range of 0.01 μm to 0.05 μm. A prime-coating layer may be formed between the flexible substrate and the abrasive layer. Also, a backing layer may be formed on the back surface of the substrate.

As the abrasive grains, which are contained in the abrasive layer, ordinarily, the materials having the abrasive effects or scratch polishing effects are used. Examples of the materials for the abrasive grains include α-alumina, γ-alumina, α·γ-alumina, fused alumina, silicon carbide, chromium oxide, cerium oxide, corundum, artificial diamond, diamond, α-iron oxide, garnet, emery (major constituents: corundum and magnetite), silica, silicon nitride, boron nitride, molybdenum carbide, boron carbide, tungsten carbide, titanium carbide, tripoli, diatomaceous earth, and dolomite. Principally, one of the above-enumerated abrasive grain materials having a Mohs hardness of at least 6 may be used alone, or two to four materials having a Mohs hardness of at least 6 may be used in combination.

The abrasive grains have a mean grain size falling within the range of 0.1 μm to 1.0 μm, and should preferably have a mean grain size falling within the range of 0.1 μm to 0.6 μm. The abrasive grains are used in amounts such that the proportions of the binder may fall within the range of 0.1 to 50 parts by weight per 100 parts by weight of the abrasive grains in the abrasive layer.

Examples of the abrasive grains include AKP1, AKP15, AKP20, AKP30, AKP50, AKP80, Hit50, and Hit100, which are supplied by Sumitomo Chemical Co., Ltd. Such abrasive grains are described in, for example, Japanese Patent Publication Nos. 52(1977)-28642 and 49(1974)-39402, Japanese Unexamined Patent Publication No. 63(1988)-98828, U.S. Pat. Nos. 3,687,725, 3,007,807, 3,041,196, 3,293,066, 3,630,010, 3,833,412, and 4,117,190, British Patent No. 1,145,349, and West Germany Patent No. 853,211.

As the binder contained in the abrasive layer of the abrasive member in accordance with the present invention, any of binders known in the art may be used. Examples of these binders include thermoplastic resins, thermosetting resins, reactive resins, electron beam-curing resins, ultraviolet-curing resins, visible light-curing resins, and mixtures of two or more of these resins.

The thermoplastic resins, which may be used as the binder in the abrasive layer of the abrasive member in accordance with the present invention, generally have a softening point of 150° C. or lower, an average molecular weight falling within the range of approximately 10,000 to approximately 300,000, and a polymerization degree falling within the range of approximately 50 to approximately 2,000. The polymerization degrees of the thermoplastic resins should preferably fall within the range of approximately 200 to approximately 600. Specifically, as the thermoplastic resin, it is possible to use, for example, a vinyl chloride-vinyl acetate copolymer, a vinyl chloride copolymer, a vinyl chloride-vinyl acetate-vinyl alcohol copolymer, a vinyl chloride-vinyl alcohol copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a synthetic rubber type thermoplastic resin, or a mixture of two or more of these compounds. Such resins are described in, for example, Japanese Patent Publication Nos. 37(1962)-6877, 39(1964)-12528, 39(1964)-19282, 40(1965)-5349, 40(1965)-20907, 41(1966)-9463, 41(1966)-14059, 41(1966)-16985, 42(1967)-6428, 42(1967)-11621, 43(1968)-4623, 43(1968)-15206, 44(1969)-2889, 44(1969)-17947, 44(1969)-18232, 45(1970)-14020, 45(1970)-14500, 47(1972)-18573, 47(1972)-22063, 47(1972)-22064, 47(1972)-22068, 47(1972)-22069, 47(1972)-22070, and 47(1972)-27886, Japanese Unexamined Patent Publication Nos. 57(1982)-133521, 58(1983)-137133, 58(1983)-166533, 58(1983)-222433, and 59(1984)-58642, and U.S. Pat. Nos. 4,571,364 and 4,752,530.

As the thermosetting resins or the reactive resins, which may be used as the binder in the abrasive layer of the abrasive member in accordance with the present invention, there should preferably be employed the resins, which have a molecular weight of 200,000 or less when the resins take on the form of coating compositions, and which exhibit an infinite increase in the molecular weight through the condensation reactions, the addition reactions, or the like, when the coating compositions are heated and humidified after being applied onto substrates and dried. Among these resins, the resins, which do not soften or melt before they decompose thermally, should more preferably be employed. Specifically, examples of the thermosetting resins or the reactive resins include a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds. Such resins are described in, for example, Japanese Patent Publication Nos. 39(1964)-8103, 40(1965)-9779, 41(1966)-7192, 41(1966)-8016, 41(1966)-14275, 42(1967)-18179, 43(1968)-12081, 44(1969)-28023, 45(1970)-14501, 45(1970)-24902, 46(1971)-13103, 47(1972)-22065, 47(1972)-22066, 47(1972)-22067, 47(1972)-22072, 47(1972)-22073, 47(1972)-28045, 47(1972)-28048, and 47(1972)-28922.

In general, the thermoplastic resins, the thermosetting resins, and the reactive resins described above respectively have their major functional groups, and one to six kinds of other functional groups. Each of the other functional groups should preferably be contained in proportions within the range of $1\times10^{-6}$ equivalent to $1\times10^{-2}$ equivalent per gram of the resin. Examples of the other functional groups include acid groups, such as a carboxylic acid group (COOM), a sulfinic acid group, a sulfenic acid group, a sulfonic acid group ($SO_3M$), a phosphoric acid group [PO(OM)(OM)], a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, and an alkyl betaine form group; basic groups, such as an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

In the abrasive member in accordance with the present invention, the above-enumerated binders are used alone, or two or more of them are used in combination. Also, the other additives are added to the abrasive layer, when necessary. The binder is contained in the abrasive layer in a proportion falling within the range of 0.1 to 50 parts by weight per 100 parts by weight of the abrasive grains. Examples of the additives include a dispersing agent, a lubricating agent, abrasive grains, an antistatic agent, an antioxidant, a mildew-proofing agent, and a solvent. In cases where the abrasive member is provided with the backing layer, the binder may be contained in the backing layer in a proportion falling within the range of 8 to 400 parts by weight per 100 parts by weight of the fine grains.

In the abrasive layer of the abrasive member in accordance with the present invention, polyisocyanates may be contained. As the polyisocyanates, it is possible to use, for example, isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups.

The polyisocyanates enumerated above should preferably have an average molecular weight falling within the range of 100 to 20,000. Such polyisocyanates are commercially available as, for example, Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone, or a mixture of two or more of them may be used by the utilization of differences in curing reaction properties. Also, in order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably be polyfunctional. The proportions of the polyisocyanate used in each of the abrasive layer and the backing layer should preferably fall within the range of 2 to 70 parts by weight per 100 parts by weight of the total of the binder and the polyisocyanate, and should more preferably fall within the range of 5 to 50 parts by weight per 100 parts by weight of the total of the binder and the polyisocyanate. Such polyisocyanates are described in, for example, Japanese Unexamined Patent Publication Nos. 60(1985)-131622 and 61(1986) -74138.

Examples of the powdered lubricating agents, which may be employed in the abrasive layer of the abrasive member in accordance with the present invention, include fine grains of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine grains of resins, such as an acryl-styrene resin, a benzoguanamine resin, a melamine resin, a polyolefin resin, a polyester resin, a polyamide resin, a polyimide resin, and a polyfluoroethylene resin.

As the lubricating agents, various organic compounds may also be employed. Examples of such organic compounds include compounds into which fluorine or silicon is introduced, such as a silicone oil (e.g., a dialkyl polysiloxane, a dialkoxy polysiloxane, a phenyl polysiloxane, or a fluoroalkyl polysiloxane, which is supplied as KF96, KF69, or the like, by Shin-Etsu Chemical Co., Ltd.), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazine, benzodiazole, and EDTA; a fatty acid ester of a monobasic fatty acid having 10 to 40 carbon atoms with one or at least two of a monohydric alcohol, a dihydric alcohol, a trihydric alcohol, a tetrahydric alcohol and a hexahydric alcohol, each alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol may fall within the range of 11 to 70; and fatty acids, fatty acid amides, fatty acid alkyl amides, and aliphatic alcohols, which have 8 to 40 carbon atoms.

Examples of these organic compound lubricating agents include butyl caprylate, octyl caprylate, ethyl laurate, butyl laurate, octyl laurate, ethyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. The above-enumerated compounds may be used alone, or two or more of them may be used in combination.

Further, in the abrasive member in accordance with the present invention, the so-called lubricating oil additives may be used as the lubricating agents. The lubricating oil additives may be used alone, or two or more of them may be used in combination. Examples of such lubricating oil additives include antioxidants known as anticorrosive agents (e.g., metal chelating agents, such as an alkyl phenol, benzotriazine, tetraazaindene, sulfamide, guanidine, nucleic acid, pyridine, amine, hydroquinone, and EDTA), rust preventives (e.g., naphthenic acid, alkenylsuccinic acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and foaming preventives. These lubricating agents are added in proportions falling within the range of 0.01 to 30 parts by weight per 100 parts by weight of the binder. Such compounds are described in, for example, Japanese Patent Publication Nos. 43(1968)-23889, 48(1973)-24041, 48(1973)-18482, 44(1969)-18221, 47(1972)-28043, and 57(1982)-56132, Japanese Unexamined Patent Publication Nos. 59(1984)-8136, 59(1984)-8139, and 61(1986)-85621, and U.S. Pat. Nos. 3,423,233, 3,470,021, 3,492,235, 3,497,411, 3,523,086, 3,625,760, 3,630,772, 3,634,253, 3,642,539, 3,687,725, 4,135,031, 4,497,864, and 4,552,794. Examples of the compounds are also described in "IBM Technical Disclosure Bulletin," Vol. 9, No. 7, p. 779 (December 1966); "ELEKTRONIK," 1961, No. 12, p. 380; and "Kagaku Benran" (Chemical Handbook), application edition, pp. 954–967, 1980, Maruzen.

Further, in the present invention, as the dispersing agents and dispersion assisting auxiliaries, it is possible to employ fatty acids having 2 to 40 carbon atoms ($R_1$COOH, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; salts of the above-enumerated fatty acids with alkali metals (Li, Na, K, and the like), alkaline earth metals (Mg, Ca, Ba, and the like), or ammonia; metallic soaps comprising Cu, Pb, and the like, (e.g., copper oleate); fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the abrasive grains or fine non-abrasive grains, or may be added during the dispersion process. Such dispersing agents and dispersion assisting auxiliaries are described in, for example, Japanese Patent Publication Nos. 39(1964)-28369, 44(1969)-17945, 44(1969)-18221, 48(1973)-7441, 48(1973)-15001, 48(1973)-15002, 48(1973)-16363, and 49(1974)-39402, and U.S. Pat. Nos. 3,387,993 and 3,470,021.

Examples of the mildew-proofing agents, which may be employed in the abrasive member in accordance with the present invention, include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetonic acid, mercury phenyloleate, bis(tributyltin) oxide, and salicylanilide. Such compounds are described in, for example, "Microbial Calamity and Preventing Technique," published by Kogaku Tosho, 1972; and "Chemistry and Industry," Vol. 32, p. 904, 1979.

As the antistatic agents, carbon black, and the like, may be employed in the abrasive member in accordance with the present invention. Examples of the antistatic agents other than carbon black include conductive grains, such as grains of graphite, modified graphite, carbon black graft polymer, tin oxide-antimony oxide, tin oxide, and titanium oxide-tin oxide-antimony oxide; natural surface active agents, such as saponin; nonionic surface active agents, such as an alkyleneoxide compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound.

Several examples of the surface active agents, which may be employed as the antistatic agents, are described in, for example, Japanese Unexamined Patent Publication No. 60(1985)-28025, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West Germany Offenlegungsschrift (OLS) No. 1,942,665, and British Patent Nos. 1,077,317 and 1,198,450. Examples of the surface active agents are also described in "Synthesis and Applications of Surface Active Agents" by Ryohei Oda, et al., Tsubaki Shoten, 1972; "Surface Active Agents" by A. W. Bailey, Interscience Publication Incorporated, 1958; "Encyclopedia of Surface Active Agents, Vol. 2" by T. P. Sisley, Chemical Publish Company, 1964; "Surface Active Agent Handbook", sixth edition, Sangyo Tosho K.K., Dec. 20, 1966; and "Antistatic Agents" by Hideo Marushige, Saiwai Shobo, 1968.

The surface active agents may be used alone, or two or more of them may be used in combination. The proportions of the surface active agent in the abrasive layer should preferably fall within the range of 0.01 to 10 parts by weight per 100 parts by weight of the abrasive grains. In cases where the surface active agent is employed in the backing layer, it may be added in proportions falling within the range of 0.01 to 30 parts by weight per 100 parts by weight of the binder. These surface active agents are used as the antistatic agents. The surface active agents may also be used for purposes other than as the antistatic agents, for example, for dispersion, for improvement of lubricating properties, as coating assisting auxiliaries, as wetting agents, as hardening accelerators, and as dispersion accelerators.

In the abrasive member in accordance with the present invention, organic solvents may be used in any proportion during the dispersing, kneading, and coating processes for the abrasive grains, the binder, and the like. Examples of such organic solvents include ketones, such as acetone, methyl ethyl ketone, methyl isobutyl ketone, cyclohexanone, and isophorone; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. Ordinarily, two or more of the above-enumerated organic solvents are used in combination in arbitrary proportions. The organic solvents may contain small amounts of impurities (e.g., polymerization products of the organic solvents, moisture, and raw material constituents of the organic solvents) in proportions of not larger than 1% by weight.

Ordinarily, the organic solvents are used in proportions falling within the range of 50 to 20,000 parts by weight per 100 parts by weight of the total solids of the coating composition for the abrasive layer. The solid contents in the coating composition for the abrasive layer should preferably fall within the range of 5% by weight to 60% by weight. Water, or the like, may be employed in lieu of the organic solvents.

When each abrasive layer is to be formed, the constituents described above are selected appropriately and dispersed or dissolved in the organic solvents, and a coating composition is thereby prepared. The coating composition is applied onto the substrate and dried. The substrate is flexible and has a thickness falling within the range of approximately 25 $\mu$m to approximately 125 $\mu$m. Examples of the materials for the substrate include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, and a polysulfone; metals, such as aluminum and copper; and ceramic materials, such as glass. Before the coating composition is applied onto the substrate, the substrate may be subjected to corona discharge treatment, plasma treatment, prime-coating treatment, heat treatment, dust-resistant treatment, metal vapor evaporation treatment, and/or alkali treatment. The substrates are described in, for example, West Germany Patent No. 3338854A specification, Japanese Unexamined Patent Publication Nos. 59(1984)-116926 and 61(1986)-129731, U.S. Pat. No. 4,388,368, and "Fiber and Industry," by Yukio Mitsuishi, Vol. 31, pp. 50–55, 1975. The surface roughness Ra, expressed in terms of arithmetic mean deviation, of the substrate should preferably fall within the range of 0.001 $\mu$m to 5.0 $\mu$m. In accordance with the characteristics, which the substrate is required to have, the Young's modulus (F5 value) in each of the longitudinal direction and the width direction of the substrate may fall within the range of 2 kg/mm$^2$ to 30 kg/mm$^2$ (1 kg/m$^2$=9.8 Pa).

No limitation is imposed on how the dispersing and kneading processes are carried out. The order, in which the constituents (the resins, the grains, the lubricants, the solvents, and the like) are added, the timing, with which the constituents are added during the dispersion and kneading processes, the temperature at which the dispersion process is carried out (and which will ordinarily fall within the range of 0° C. to 80° C.), and the like, may be selected appropriately. One of various types of kneading machines may be used in order to prepare the coating composition for the abrasive layer. For example, it is possible to use a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine. Ordinarily, a plurality of the dispersing and kneading machines are used, and the dispersing and kneading processes are carried out continuously. Details of the dispersing and kneading techniques are described in, for example, "Paint Flow and Pigment Dispersion," by T. C. Patton, John Wiley & Sons, 1964; "Industrial Materials," by Shin-ichi Tanaka, Vol. 25, p. 37, 1977; and literature cited in these publications. As auxiliary means for the dispersing and kneading techniques, steel balls, steel beads, ceramic beads, glass beads, and organic polymer beads, which have sizes equivalent to sphere diameters of 0.05 mm to 10 cm, may be used in order to carry out the dispersing and kneading processes efficiently. The shapes of these materials are not limited to spheres. These materials are described in, for example, U.S. Pat. Nos. 2,581,414 and 2,855,156. In the present invention, the coating composition for the abrasive layer may be prepared by carrying out the dispersing and kneading processes in accordance with the methods described in the aforesaid publications, the literature cited therein, and the like.

By the setting of the processing time (dispersing time) for which the aforesaid dispersing and kneading processes are carried out, the surface roughness of the surface of the abrasive layer, which is formed by applying the coating composition onto the substrate, can be adjusted. In order for the aforesaid smooth surface of the abrasive layer to be obtained, the dispersing time is set to be long.

When the coating composition for the abrasive layer is to be applied onto the substrate, the viscosity of each coating composition may be adjusted at a value falling within the range of 1 to 20,000 centistrokes at 25° C. The coating composition may be applied onto the substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater. The other coating methods may also be used. The coating methods are described in, for example, "Coating Engineering," published by Asakura Shoten, pp. 253–277, Mar. 20, 1971. The order, in which the coating compositions are applied, may be selected arbitrarily. Before the desired coating composition is applied to the substrate, a prime-coating layer may be applied, or corona discharge treatment, or the like, may be carried out in order to enhance the adhesion to the substrate. For the formation of a plurality of abrasive layer, simultaneous multi-layer coating, successive multi-layer coating, or the like, may be carried out. Such coating methods are described in, for example, Japanese Unexamined Patent Publication Nos. 57(1982)-123532, 59(1984)-142741, and 59(1984)-165239, and Japanese Patent Publication No. 62(1987)-37451.

With the methods described above, the coating composition for the abrasive layer is applied to a thickness of, for example, approximately 1 $\mu$m to approximately 200 $\mu$m on the substrate. The applied coating composition is then immediately dried in a plurality of steps at temperatures of 20° C. to 130° C., and thereafter the formed abrasive layer is dried to a thickness of 0.05 $\mu$m to 10 $\mu$m. At this time, ordinarily, conveyance of the substrate is carried out at a conveyance speed of 10 m/minute to 900 m/minute, the drying temperatures in a plurality of drying zones are adjusted at 20° C. to 130° C., and the amount of the solvent remaining in the coating film is set at 0.1 mg/m$^2$ to 40 mg/m$^2$. When necessary, a surface smoothing process may then be carried out, and the surface roughness Ra, expressed in terms of arithmetic mean deviation, of the abrasive layer or the backing layer is set to fall within the range of 0.01 $\mu$m to 0.05 $\mu$m (cut-off value: 0.08 mm), preferably within the range of 0.01 $\mu$m to 0.025 $\mu$m. The abrasive member web may then be cut into a desired shape. The abrasive member in accordance with the present invention is thereby produced. In this case, pre-treatment and surface treatment of powder, kneading and dispersing, coating, drying, smoothing, heat treatment, EB treatment, surface abrading, cutting, and winding processes should preferably carried out continuously.

The smoothing process is also referred to as the calendering process. With the calendering process, the surface of the abrasive layer can be smoothed. As the calendering rolls, a metal roll and a resin roll, such as a nylon roll or an epoxy roll, may be employed. The processing temperature should preferably fall within the range of 30° C. to 100° C., and the load should preferably fall within the range of 50 kg/cm to 300 kg/cm. The smoothness of the surface of the abrasive layer varies in accordance with the processing temperature and the load conditions. In cases where the processing is carried out in a plurality of steps, the processing can be finished quickly. Such techniques are described in, for example, Japanese Patent Publication Nos. 39(1964)-28368, 40(1965)-23625, 47(1972)-38802, 48(1973)-11336, and 52(1977)-17404, Japanese Unexamined Patent Publication Nos. 49(1974)-53631, 50(1975)-112005, 51(1976)-77303, 60(1985)-70532, and 2(1990)-265672, U.S. Pat. Nos. 3,473,960, 4,728,569, and 4,746,542, and British Patent No. 1,191,424. Also, the method described in Japanese Patent Publication No. 41(1966)-13181 is considered as being a basic and important technique in this field.

The thus formed abrasive member is cut or punched into a desired shape. In the process prior to the cutting process, the abrasive member should preferably be burnished and/or cleaned. Specifically, with the burnishing process, protrusions on the surface of the abrasive member are scraped out, and the surface of the abrasive member is thereby made smooth by using a hard material, such as a sapphire blade, a shaving blade, a hard material blade, a diamond blade, or a ceramic blade. No limitation is imposed on the hardness of the material used for the burnishing process, and any of materials, which can remove protrusions on the surface of the abrasive member, may be employed. However, the Mohs hardness of the material used for the burnishing process should preferably be 8 or higher. The materials need not necessarily take on the form of blades and may have other shapes, such as square, round, and wheel shapes. (The material may be provided on the circumferential surface of a rotatable cylinder.)

The cleaning process is carried out in order to remove foreign substances, excessive lubricating agents, and the like, from the surface of the abrasive member. For this purpose, the surface layers of the abrasive member are wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), various abrasive tapes supplied by Fuji Photo Film Co., Ltd., a nylon nonwoven fabric, a polyester nonwoven fabric, a rayon nonwoven fabric, an acrylonitrile nonwoven fabric, a mixed nonwoven fabric, and tissue paper. Such materials are also described in, for example, Japanese Patent Publication Nos. 46(1971)-39309, 58(1983)-46767, and 58(1983)-46768, and Japanese Unexamined Patent Publication Nos. 56(1981)-90429, 63(1988)-259830, and 1(1989)-201824.

As for the abrasive grains, the binder, the additives (such as lubricating agents, dispersing agents, antistatic agents, surface treatment agents, carbon black, abrasive grains, light blocking agents, antioxidants, and mildew-proofing agents), the solvents, and/or substrates (which may be provided with a prime-coating layer, a backing layer, and a back prime-coating layer), which may be utilized for the abrasive member in accordance with the present invention, and how to prepare these constituents, reference may be made to, for example, the method for making an abrasive member, which is disclosed in Japanese Patent Publication No. 56(1981)-26890.

EXAMPLES

The present invention will further be illustrated by the following nonlimitative examples. In these examples, the term "parts" means parts by weight.

Examples 1, 2, 3, 4, and 5

A coating composition A for an abrasive layer shown below was applied with a bar coating process onto a polyester substrate having a thickness of 75 $\mu$m such that the dry thickness of the abrasive layer might be 3 $\mu$m. The abrasive layer was formed in this manner. After the application of the coating composition A, the resulting abrasive member was subjected to a calendering process, and the surface of the abrasive layer was thereby smoothed. In Examples 1 through 5, the linear load in the calendering process was changed within the range of 100 kg/cm to 300 kg/cm.

The abrasive member (abrasive sheet) described above was punched into a disk shape having a diameter of 200 mm. The disk-like abrasive member having thus been obtained was secured to a rotatable plate constituted of rubber. While the rotatable plate was being rotated at a speed of 100 rpm, an optical connector ferrule was subjected to a planetary movement on the rotatable plate, and the end of the optical connector ferrule was brought into contact with the abrasive layer. In this manner, polishing was carried out for 20 seconds. During the polishing, a coolant solution was supplied to the position, at which the end of the optical connector ferrule came into contact with the surface of the abrasive member. As the coolant solution, an aqueous solution containing colloidal silica having a grain diameter of 0.02 μm was used.

The calendering conditions shown in Table 1 below were used for the aforesaid abrasive member. Also, as for the abrasive member, the surface roughness Ra of the surface of the abrasive layer, the light amount transmission loss of the optical connector ferrule having been abraded with the abrasive member, and the difference in level between the ferrule surface and the optical fiber surface were measured. The results shown in Table 1 were obtained.

As the light amount transmission loss, the amount of loss of the transmitted light amount due to reflection from the abraded surface of the optical fiber was measured. In accordance with the light amount transmission loss, the surface smoothness, or the like, can be rated. A large dB value indicates a good transmission state. According to the current standard, the dB value should be at least 45 dB. As for the difference in level between the ferrule surface and the optical fiber surface, a silica glass constituting the optical fiber and zirconia constituting the ferrule were abraded with the abrasive member, and the difference in level occurring between the silica glass surface and the zirconia surface was measured. A small difference in level indicates good polishing. According to the current standard, the difference in level should be at most 0.05 μm.

Comparative Examples 1 and 2

The test results obtained in Comparative Examples 1 and 2 are also shown in Table 1. In Comparative Examples 1 and 2, the same coating composition for the abrasive layer was applied onto the same kind of the substrate as that in Examples 1 through 5 described above. In Comparative Example 1, the calendering process for smoothing the surface of the abrasive layer was not carried out. In Comparative Example 2, the calendering temperature was set to be low, and the surface smoothing effects were low.

| Coating composition A: | |
|---|---|
| Abrasive grains (chromium oxide, mean grain diameter: 0.5 μm) | 100 parts |
| Binder (vinyl chloride resin) | 3 parts |
| Binder (polyester polyurethane, content of sulfonic acid group: 3 × 10$^{-3}$ equivalents per g of the resin, content of epoxy group: 2 × 10$^{-5}$ equivalents per g of the resin) | 5 parts |
| Binder (polyisocyanate, a reaction product of 3 mols of tolylene diisocyanate with 1 mol of trimethylolpropane) | 2 parts |
| Dispersing agent (lecithin) | 1 part |

-continued

| Coating composition A: | |
|---|---|
| Lubricating agent (butyl stearate) | 1 part |
| Diluting agent (methyl ethyl ketone/cyclohexanone = 2/1) | 200 parts |
| Diluting agent (toluene/MIBK) | 150 parts |

TABLE 1

| | Calendering temp. (° C.) | Load (kg/cm) | Speed (m/minutes) | Ra of abrasive layer (nm) | Light amount transmission loss (dB) | Difference in level (μm) |
|---|---|---|---|---|---|---|
| Ex. 1 | 40 | 100 | 100 | 45 | 50 | 0.05 |
| Ex. 2 | 40 | 150 | 100 | 35 | 50 | 0.05 |
| Ex. 3 | 40 | 200 | 100 | 25 | 50 | 0.01 |
| Ex. 4 | 40 | 250 | 100 | 20 | 50 | 0.01 |
| Ex. 5 | 40 | 300 | 100 | 15 | 50 | 0.01 |
| Comp. Ex. 1 | None | | | 60 | 45 | 0.1 |
| Comp. Ex. 2 | 30 | 100 | 100 | 55 | 45 | 0.1 |

As is clear from the results shown in Table 1, in cases where the end of the optical connector ferrule is abraded with each of the abrasive members of Comparative Examples 1 and 2, in which the surface roughness of the abrasive layer is 60 nm or 55 nm and the smoothness of the surface is low, though the light amount transmission loss is 45 dB, the difference in level at the abraded end of the optical connector ferrule is as large as 0.1 μm. On the other hand, with the abrasive members of Examples 1 through 5 in accordance with the present invention, the light amount transmission loss is 50 dB, indicating a good transmission state, and the difference in level at the abraded end of the optical connector ferrule is small. In particular, with the abrasive members of Examples 3, 4, and 5, in which the surface roughness Ra is at most 25 nm, the difference in level at the abraded end of the optical connector ferrule is very small, indicating a good abrasion state.

Examples 6, 7, 8, 9, and 10

A coating composition B for an abrasive layer shown below was prepared with a dispersing process using a sand grinder. The coating composition B was applied with a bar coating process onto a polyester substrate having a thickness of 75 μm such that the dry thickness of the abrasive layer might be 6 μm. The abrasive layer was formed in this manner. The surface roughness Ra of the abrasive layer was adjusted by the setting of the dispersing time for the coating composition for the abrasive layer. In Examples 6, 7, 8, and 9, the dispersing time was set to be as long as 5 to 20 hours, the calendering process was carried out under the same conditions as those in Example 1, and the surface roughness was thereby adjusted to be at most 45 nm. In Example 10, the dispersing time was set to be as long as 25 hours, the calendering process was not carried out, and the surface roughness was thereby adjusted to be 50 nm.

In the dispersing process using the sand grinder, 100 ml of glass beads having a diameter of 1 mm were introduced into a 200-ml vessel, and the dispersing process was carried out at a speed of 1,500 rpm for the specified time.

The abrasive member (abrasive sheet) described above was punched into a disk shape having a diameter of 140 mm.

As in Example 1, the disk-like abrasive member having thus been obtained was secured to a rotatable plate constituted of rubber. While the rotatable plate was being rotated at a speed of 100 rpm, an optical connector ferrule was subjected to a planetary movement on the rotatable plate, and the end of the optical connector ferrule was brought into contact with the abrasive layer. In this manner, polishing was carried out for 50 seconds. During the polishing, a coolant solution was supplied to the position, at which the end of the optical connector ferrule came into contact with the surface of the abrasive member. As the coolant solution, an aqueous solution containing colloidal silica having a grain diameter of 0.05 μm was used.

In each of Examples 6 through 10, the dispersion time was set as shown in Table 2. Also, as for each abrasive member, the surface roughness Ra of the surface of the abrasive layer, the surface roughness Ra of the surface of the optical fiber having been abraded with the abrasive member, and the difference in level between the ferrule surface and the optical fiber surface were measured. The results shown in Table 2 were obtained.

Comparative Examples 3, 4, and 5

The test results obtained in Comparative Examples 3, 4, and 5 are also shown in Table 2. In each of these Comparative Examples, the value of the surface roughness of the abrasive layer was large. In Comparative Example 3, the dispersing time was set to be one hour, and the calendering process was not carried out. In Comparative Example 4, the dispersing time was set to be one hour, and the calendering process was carried out. In Comparative Example 5, the dispersing time was set to be as long as five hours, and the calendering process was not carried out.

| Coating composition B: | |
|---|---|
| Abrasive grains (chromium oxide, mean grain diameter: 0.2 μm) | 100 parts |
| Binder (polyester polyurethane, content of sulfonic acid group: 3 × 10$^{-3}$ equivalents per g of the resin, content of epoxy group: 2 × 10$^{-5}$ equivalents per g of the resin) | 10 parts |
| Binder (polyisocyanate, a reaction product of 3 mols of tolylene diisocyanate with 1 mol of trimethylolpropane) | 3 parts |
| Dispersing agent (oleic acid) | 1 part |
| Lubricating agent (butyl myristate) | 1 part |
| Diluting agent (methyl ethyl ketone/cyclohexanone = 2/1) | 300 parts |
| Diluting agent (toluene/MIBK/toluene = 1/1/1) | 250 parts |

TABLE 2

| | Dispersing Time (hour) | Calendering (kg/cm) | Ra of abrasive layer (nm) | Ra of abraded surface (nm) | Difference in level (μm) |
|---|---|---|---|---|---|
| Comp. Ex. 3 | 1 | None | 70 | 12 | 0.3 |
| Comp. Ex. 4 | 1 | Carried out | 55 | 12 | 0.2 |
| Comp. Ex. 5 | 5 | None | 65 | 10 | 0.3 |

TABLE 2-continued

| | Dispersing Time (hour) | Calendering (kg/cm) | Ra of abrasive layer (nm) | Ra of abraded surface (nm) | Difference in level (μm) |
|---|---|---|---|---|---|
| Ex. 6 | 5 | Carried out | 45 | 3 | 0.01 |
| Ex. 7 | 10 | Carried out | 35 | 3 | 0.01 |
| Ex. 8 | 15 | Carried out | 25 | 3 | 0.01 |
| Ex. 9 | 20 | Carried out | 15 | 3 | 0.01 |
| Ex. 10 | 25 | None | 50 | 3 | 0.05 |

As is clear from the results shown in Table 2, with each of the abrasive members of Comparative Examples 3, 4, and 5, in which the value of the surface roughness of the abrasive layer is large and the surface is rough, the value of the surface roughness of the abraded surface of the optical fiber is large, and it is expected that the loss in the transmitted light amount cannot be kept small. Also, with each of the abrasive members of Comparative Examples 3, 4, and 5, the difference in level at the abraded end of the optical connector ferrule is large. On the other hand, with the abrasive members of Examples 6 through 10 in accordance with the present invention, in which the value of the surface roughness Ra is small, good abrasion characteristics are obtained, the value of the surface roughness of the abraded surface of the optical fiber is small, and the smooth polishing can be carried out. Also, with the abrasive members of Examples 6 through 10 in accordance with the present invention, the difference in level at the abraded end of the optical connector ferrule is small.

What is claimed is:

1. An abrasive member for a very high return loss optical connector ferrule, the abrasive member being used in abrading an end of an optical connector ferrule having a ferrule hole, in which an optical fiber has been inserted and secured, into a convex spherical surface, the abrasive member comprising a flexible substrate and an abrasive layer, which is formed on the surface of the flexible substrate and comprises a binder and abrasive grains, wherein the surface roughness Ra, expressed in terms of arithmetic mean deviation, of the abrasive layer falls within the range of 0.01 μm to 0.05 μm, and wherein the abrasive grains contained in the abrasive layer are constituted of chromium oxide grains having a mean grain diameter falling within the range of 0.1 μm to 1 μm.

2. An abrasive member as defined in claim 1 wherein the thickness of the flexible substrate falls within the range of 25 μm to 125 μm.

3. A method for abrading an end of an optical connector ferrule having a ferrule hole, in which an optical fiber has been inserted and secured, into a convex spherical surface, comprising contacting the end of the optical connector ferrule with an abrasive member as defined in claim 1, wherein the end of the optical connector ferrule is abraded while a coolant solution is being supplied to the surface of the abrasive layer, said coolant solution containing fine abrasive grains, which are constituted of alumina or silica.

4. A method as defined in claim 3 wherein the silica is colloidal silica.

* * * * *